United States Patent [19]

Pastushenko et al.

[11] 4,400,609
[45] Aug. 23, 1983

[54] DEVICE FOR DETECTING SEAM BETWEEN ABUTTING WORKPIECES BY ELECTRON BEAM

[76] Inventors: Jury I. Pastushenko, ulitsa Granichnaya, 12a, kv. 1; Gleb A. Spynu, Prospekt Nauki, 141/2, korpus 12, kv. 12; Oleg K. Nazarenko, ulitsa Sapernoe pole, 28, kv. 27; Viktor E. Lokshin, pereulok Zhukovskogo, 5, kv. 26; Vladimir I. Shapoval, ulitsa Sholom Aleikhem, 15B, kv. 83, all of Kiev, U.S.S.R.

[21] Appl. No.: 188,312

[22] Filed: Sep. 18, 1980

[51] Int. Cl.³ .............................................. B23K 15/00
[52] U.S. Cl. ..................... 219/121 EV; 219/121 EC; 219/121 EW
[58] Field of Search .................. 219/121 EB, 121 EC, 219/121 ED, 121 EM, 121 EV, 121 EW

[56] References Cited

U.S. PATENT DOCUMENTS

| | | | |
|---|---|---|---|
| 3,426,174 | 2/1969 | Graham et al. | 219/121 EM |
| 3,743,776 | 7/1973 | Corcelle et al. | 219/121 EW X |
| 3,752,952 | 8/1973 | Ruge et al. | |
| 3,993,889 | 11/1976 | Sciaky | 219/121 EW X |

FOREIGN PATENT DOCUMENTS

| | | | |
|---|---|---|---|
| 2082774 | 12/1971 | France | 219/121 EB |
| 52-77847 | 6/1977 | Japan | 219/121 EW |
| 1179161 | 1/1970 | United Kingdom | 219/121 EW |

Primary Examiner—J. V. Truhe
Assistant Examiner—Keith E. George
Attorney, Agent, or Firm—Lilling & Greenspan

[57] ABSTRACT

A device, for tracking a seam between abutting workpieces by a scanning electron beam, includes a scanning electron beam generating source, a power supply source of the scanning electron beam generating source, at least one secondary emission detector accommodated within a shield and positioned during welding between the scanning electron beam generating source and a workpiece being welded. The detector has an aperture for the scanning electron beam to pass through, and a tap to which is connected a generator of information signals indicative a variation in the surface of the workpiece being welded. This information signal generator is constructed as a differential unit having one input connected to the detector tap, and the other input connected to the power supply source of the scanning electron beam generating source. The information signal indicative of variation in the workpiece surface is formed at the output of the differential unit, and corresponds to the difference between a signal representative of the scanning electron beam pulsation and a signal representative of a secondary electron flow, produced in a zone of electron beam impingement on the workpiece surface being scanned and received by the secondary emission detector.

5 Claims, 8 Drawing Figures

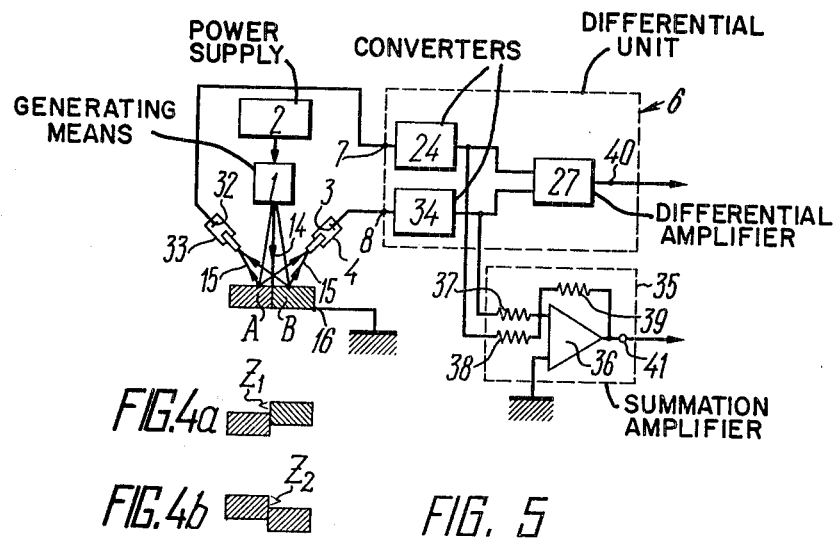
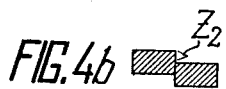
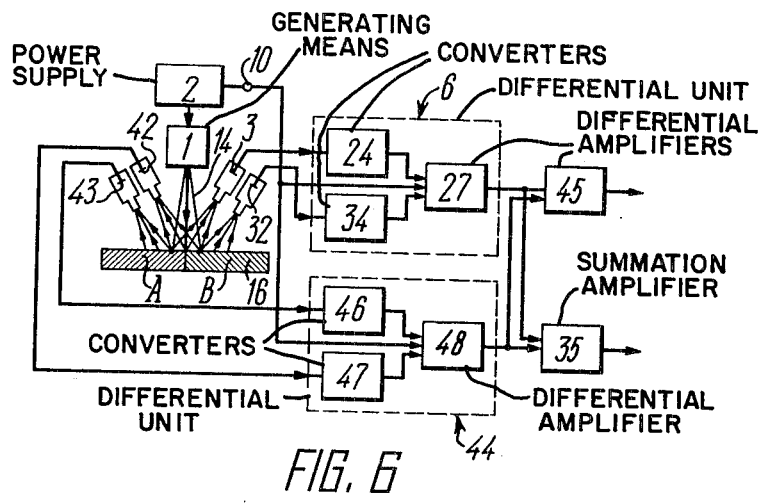

DEVICE FOR DETECTING SEAM BETWEEN ABUTTING WORKPIECES BY ELECTRON BEAM

BACKGROUND OF THE INVENTION

1. Field of the Invention

The present invention relates to electron beam welding practice and, more particularly, to a device for detecting a seam between abutting workpieces by a scanning electron beam.

The invention can be most advantageously used in control systems for automatically directing a welding electron beam at the seam formed between workpieces to being joined.

2. Description of the Prior Art

Owing to its technological possibilities electron beam welding is finding ever increasing application for joining high-melting and chemically resistant metals, as well as in manufacturing articles from conventional materials such as steels, aluminium alloys, and copper-based alloys.

A quality joint weld can be obtained provided that, apart from meeting requrements of current parameters of the scanning electron beam, the electron beam is properly positioned relative to the seam. It is quite evident, at the sametime, that because of various irregularities in seams to produce a high-quality joint weld is impossible without accurately positioning and moving the electron beam along the seam. Special features of electron beam welding at high temperatures and speeds of treating articles, which make visual control over the welding process extremely inconvenient, on the one hand, and ever growing application of the electron beam welding on the other, account for the ever increasing importance of systems of automatically directing the electron beam at the seam.

Precision of automatically directing the welding electron beam at the seam being formed depends to a great extent on the degree of accuracy of means used for automatically detecting and tracking the seam. Prior art seam detecting devices can be divided into four main groups: mechanical, electromechanical, photoelectrical, and electronic. The mechanical seam detecting devices, though simple in construction, feature a low degree of accuracy, which is responsible for their limited application.

Higher degree of accuracy and efficiency are displayed by the electromechanical seam detecting devices. For instance, a system for automatically directing the welding electron beam at the seam formed between the articles being welded, developed by the company "Sciaky" (France), employs a mechanical tracer for tracking the seam formed between the articles being joined, which tracer being mounted on the electron gun so that the tracer pin is located ahead of the electron beam, and an information electric signal generating unit for producing a signal indicative of variations in the workpiece surface. This information electric signal considerably improves the degree of accuracy of directing the welding electron beam at the seam and widens functional possibilities of the systems in which it is employed, for instance, by employing electronic computers. However, combination of mechanical and electrical (and even electronic) devices is associated with considerable difficulties. In addition, such a combination inevitably causes loss of information and time both in the mechanical units and interaction between mechanical devices and electrical circuits.

Application for the above purpose of the photoelectric seam detecting means encounters the same difficulties as in the case of electromechanical means. The necessity of maintaining the required transparency of lenses during the welding process is a further disadvantage of the photoelectric systems. This disadvantage is that metal vapours produced by the electron beam impingement upon the workpiece surface settle on the lenses, thereby obscuring the image of the article being welded.

All the above systems for automatically directing the welding electron beam at the seam require various additional operations before welding proper such as, for example, treatment of edges, arrangement of reflecting line along the seam, etc.

More promising at present are systems of automatically directing the welding electron beam at the seam, employing electronic means for tracking the seam. Such apparatus have a number of advantages over the above-described systems. Thus, the information on position of the welding electron beam relative to the seam between the workpieces being joined is obtained with the aid of the electrons reflected from the surface of the workpiece as a result of the electron beam impingement upon this surface, which electrons are conventionally termed as secondary electrons. The intensity of the secondary electrons flow is known to depend on the electron beam current and the surface variations of a workpiece being welded. These surface variations are detected by scanning the workpiece surface with the aid of a scanning electron beam. When the electron beam crosses the seam, the intensity of the secondary electrons flow varies in response to which an electric pulse is formed which is termed as an information signal indicative of variations in the workpiece surface. The scanning electron beam is generated either by a special tracking electron beam gun or by a welding electron beam gun, in which case the welding electron beam gun is alternately switched from welding to scanning mode of operation.

The U.S. Pat. No. 3,426,174 describes a device for tracking a seam between workpieces being joined using a scanning electron beam. The device comprises a means for generating a scanning beam, connected to a power supply source, and an electron back scatter detector disposed in a shield and positioned during welding between the scanning electron beam generating means and the workpiece to be welded. The back scatter detector has an aperture intended for beam passage therethrough, and a tap. Connected to the tap is a resistor across which there is formed an information signal, which resistor functions as a generator of information signals indicative of surface variations, and in particular of the presence of the seam in the scanning electron beam impingement zone. These information signals are used for directing the electron welding beam at the seam between abutting workpieces being joined. The detector is shielded to prevent its being influenced by stray electrons as, for example, backscattered from an adjacent welding beam.

A display error of the above device depends on the error in forming the signal indicative of variation in workpiece surface conditions, as well as on the other errors, for instance, such as instrumental errors of the electron beam deflection system, etc. The degree of accuracy of the device is also affected by electromagnetic fields produced as a result of interaction of the welding electron beam with the metal vapours, and by a time constant of the signal generator constructed as a resistor. The shape of the signal indicative of surface variations is not protected from influence of the scanning electron beam current pulsations. Though the shield accommodating the detector protects to a great extent the device operation from the enfluence of electromagnetic fields, complete elemination of the electromagnetic field influence can be achieved provided the shield entirely envelops the detector, in which case such a shield would be in contact with the workpiece being welded. This, of course, would considerably limit the technological possibilities of the device as a whole.

SUMMARY OF THE INVENTION

The principal object of the invention is to improve the degree of accuracy of a device for detecting a seam between abutting workpieces by a scanning electron beam.

Another object of the invention is to widen a passing band of a device for detecting a seam between abutting workpieces by a scanning electron beam.

A further object of the invention is to enhance noise immunity of a device for detecting a seam between abutting workpieces by a scanning electron beam.

This and other objects of the invention are accomplished by a device for detecting a seam between abutting workpieces comprising an electron beam generating means connected to a power supply source, and at least one secondary emission detector accommodated inside a shield and adapted for being placed during welding between the scanning electron beam generating means and a workpiece to be welded. The detector has an aperture for the electron beam to pass through, and a tap to which is connected an information signal generator adapted for generating a signal indicative of variations in the workpiece surface. According to the invention the information signal generator is constructed as a differential unit having one input connected to the detector tap, and the other input connected to the power supply source of the scanning electron beam generating means. At the differential unit output, which is the output of the device, there is formed a signal carrying information on variation in the workpiece surface and corresponding to the difference between a signal representative of the electron beam pulsation and a signal representative of the secondary electron flow produced in a zone of the electron beam impingement on the workpiece surface.

The construction of the information signal generator as a differential unit permits the pulsation interference of the scanning electron beam as well as offsets the influence of the other electron emitting sources.

For protecting the differential unit from magnetic fields it is expedient that said differential unit be constructed as a differential transformer having one primary winding connected to the detector tap, and the other primary winding connected to the power supply source of the scanning electron beam generating means, the output of its secondary winding being the output of the device.

It is expedient that for widening the passing band of the device and improving fidelity of the information signal relative to variation in the surface being scanned, the differential unit may include a secondary emission current-to-voltage converter constructed in the form of an operational amplifier having its inverting input connected to the detector tap, its non-inverting input grounded, and its output connected to one of the inputs of the differential amplifier constructed in the form of an operational amplifier. The other input of the differential amplifier is connected to the power supply source of the scanning electron beam generating means. The output of this amplifier is the output of the device.

For eliminating interference of stray electrons from the other sources, it is expedient to provide the proposed device with two secondary emission detectors disposed in tubular shields and positioned relative each other so that the secondary electron detection zones of the detectors are equal and adjoin each other, with the detection zone of one of the detectors coinciding with the scanning electron beam impingement zone. In this case the differential unit should be provided with two secondary emission current-to-voltage converters, each having its input connected to one of the detectors. The outputs of these converters are to different inputs of the differential amplifier whose output is the output of the device. Such construction of the device permits an interference effect of electrons from other sources to be offset.

For determining the amount of misalignment of abutting workpieces, it is expedient to provide the proposed device with two detectors disposed in the above-mentioned tubular shields positioned so that the detection zones of the detectors coincide with the scanning electron beam impingement zone, in which case the differential unit should have two secondary emission current-to-voltage converters, each having an input connected to one of the detectors and an output connected to a respective input of the differential amplifier. The device should also include a summation amplifier constructed of an operational amplifier having its input electrically connected to the outputs of the secondary emission current-to-voltage converters, and its non-inverting input being grounded.

The outputs of the differential and summation amplifiers are the outputs of the device. The information signal indicative of variation in the workpiece surface is formed at the output of the summation amplifier, and the signal representing the amount of misalignment of the abutting workpiece edges is formed at the output of the differential amplifier.

BRIEF DESCRIPTION OF THE DRAWINGS

These and other objects and advantages of the present invention will appear from the following description of embodiments thereof which are represented in the accompanying drawings.

FIG. 5 is an alternative embodiment of the device wherein two secondary emission detectors and a summation amplifier are provided; and FIG. 6 is a block diagram of an alternative embodiment of the device wherein four secondary emission detectors, two differential units and two summation amplifiers are provided.

Figure 1:
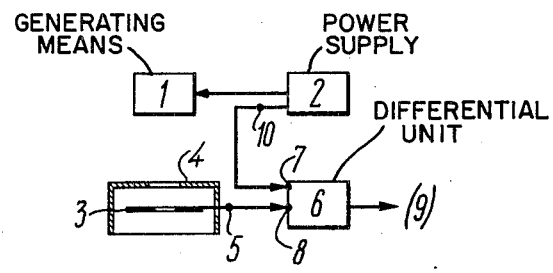
FIG. 1 is a block diagram of the device for detecting a seam between abutting workpieces according to the invention.

It should be noted that the accompanying drawings are given for illustrations of embodiments of the present invention and are not intended to limit sizes of the device components or the size relationship therebetween.

DETAILED DESCRIPTION OF THE INVENTION

The device for detecting a seam between abutting workpieces' edges by a scanning electron beam (FIG. 1) comprises a scanning electron beam generating means 1 connected to a power supply source 2, and a secondary emission detector 3 adapted for collecting secondary electrons and disposed in a tubular shield 4. Connected to a tap 5 of the secondary emission detector 3 is a generator of an information signal indicative of variation in the workpiece surface, constructed as a differential unit 6 and having inputs 7 and 8. An output 9 of the differential unit 6 is the output of the device and intended for connection to a system for automatically directing the welding electron beam at the seam formed between the edges of the workpieces being joined. The power supply source 2 of the electron beam generating means 1 is connected with the differential unit 6 through its tap 10.

Figure 2:
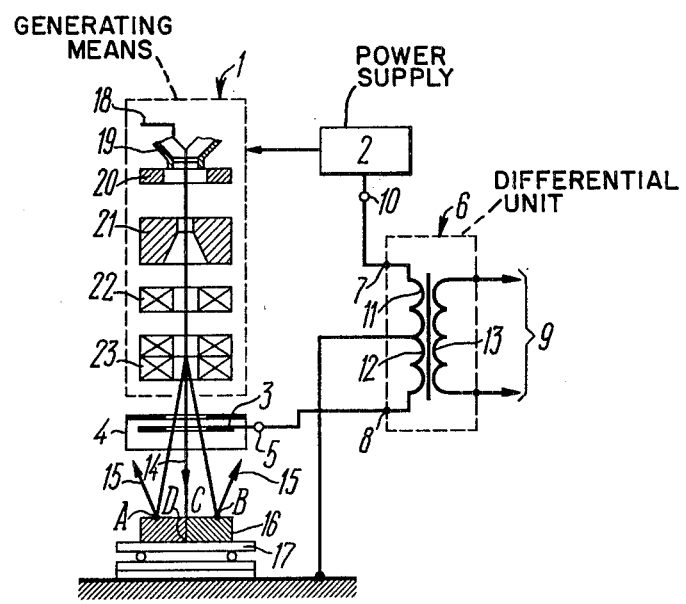
FIG. 2 is a block diagram of an alternative embodiment of the device wherein the differential unit is constructed as a differential transformer.

Shown in FIG. 2 is an alternative embodiment of the device wherein, according to the invention, the differential unit 6 is constructed as a differential transformer having its primary windings 11 and 12 being in antiparallel relationship relative to each other and respectively connected to inputs 7 and 8 of the differential unit 6, and its secondary winding 13 connected to the output 9 of the same differential unit 6. For better understanding of the nature of the invention, FIG. 2 schematically represents the scanning electron beam generating means 1, the secondary electrons flow/shown by arrows 14 and 15, and the workpiece 16 being welded, placed on the carriage 17. The electron beam generating means comprises a heating filament 18, a cathode 19 emitting electrons, a control electrode 20, an anode 21, and focussing and deflection electromagnetic systems 22 and 23, respectively. In FIG. 2 are also represented an electron beam impingement zone AB, and a seam CD formed between the workpieces being welded.

Figure 3:
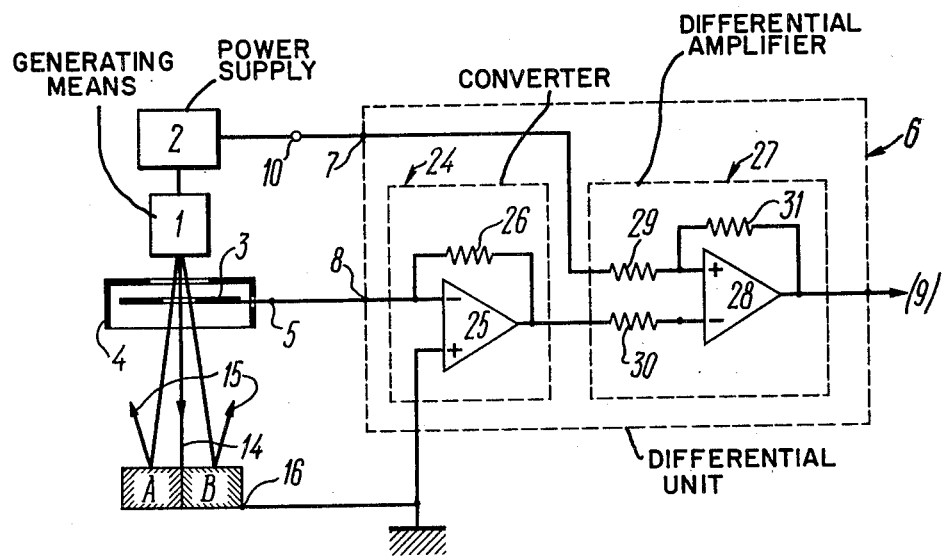
FIG. 3 is a block diagram of an alternative embodiment of the device wherein the differential unit includes a secondary emission current-to-voltage converter.

Referring now to FIG. 3, the differential unit 3 comprises a secondary emission current-to-voltage converter 24 constructed as an operational amplifier 25 to whose inversion input is connected a feedback resistor 26 and the tap 5 of the detector 3. The unit 6 further includes a differential amplifier 27 consisting of an operational amplifier 28 whose operating mode is set by resistors 29 and 30 and a feedback resistor 31. The output of the operational amplifier 25 is connected through the resistor 30 to the inversion input of the operational amplifier 28 whose second input is connected through the resistor 29 to the output 10 of the power supply source 2. The output of the differential amplifier 27 is the output 9 of the differential unit 6.

Such a construction of the information signal generator unit 6 as shown in FIGS. 2, and 3 permits the electromagnetic fields produced by interaction of the electron beam with metal vapors, when welding in a vacuum chamber, to be eliminated. This is possible due to the fact that the differential transformer and the operational amplifiers are linear and their passing band is intended for the frequences which are lower than the frequency of the electromagnetic oscillation of the plasma produced in the space enveloping the focal point of the electron beam. A low input resistance of the transformer and operational amplifier provides for a high operating speed of the device. At the same time, its being connected to the power supply source prevents the scanning electron beam pulsations from affecting the quality of signal indicative of variations in the workpiece surface being scanned.

Figure 4:
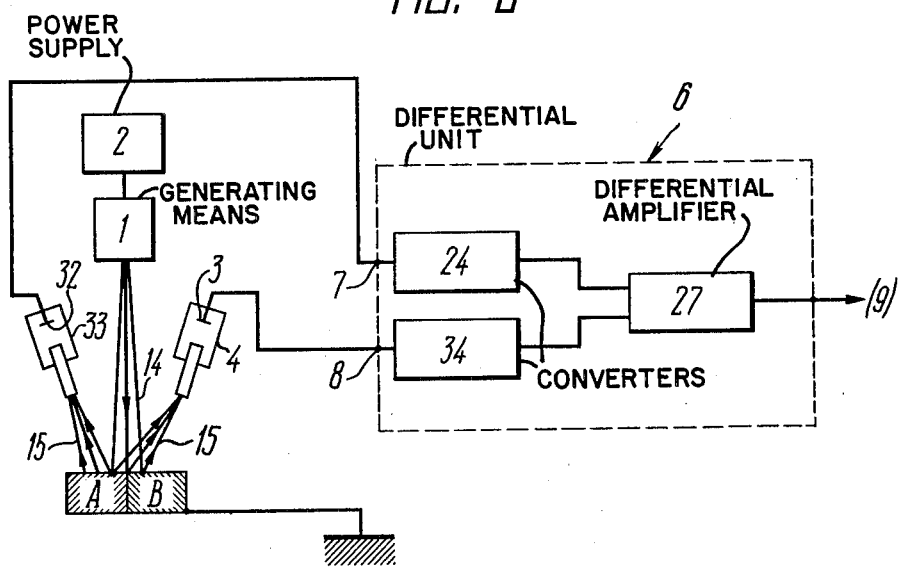
FIG. 4 is a block diagram of an alternative embodiment of the device wherein two secondary emission detectors are provided, and the differential unit includes two secondary emission current-to-voltage converters.

Shown in FIG. 4 is an alternative embodiment of the proposed device having two secondary emission detectors 3 and 32 accommodated in tubular shields 4, 33, and two secondary emission current-to-voltage converters 24 and 34. The detectors 3 and 32 have equal detection zones and are so positioned that their zones of detection adjoin each other, the detection zone of the detector 3 coinciding with the scanning electron beam impingement zone AB. The differential unit 6 also includes the differential amplifier 27. The construction of the converter 34 is similar in construction to the converter 24, and therefore is not shown in FIG. 3. Connected to the detectors 3 and 32 are the inversion inputs of the operational amplifiers of the converters 24 and 34 respectively, the non-inversion inputs of these operational amplifiers being grounded. The outputs of the operational amplifiers of the converters 24 and 34 are connected to different inputs of the differential amplifier 27 whose output is the output 9 of the device.

Such construction of the proposed device prevents stray electrons from other sources from affecting the formation of the signal indicative of variations in the workpiece 16 surface being scanned by the scanning electron beam 14.

FIG. 5 shows an alternative embodiment of the proposed device enabling the amount of misalignment of the abutting edges to be displayed. As can be seen in this figure the detectors 3 and 32 accommodated in the tubular shields 4,33 are so positioned that their zones of detection being equal in size coincide with the scanning electron beam 14 impingement zone AB. The differential unit 6 includes the converters 24 and 34 and the differential amplifier 27, all of which are constructed as disclosed above. The device also includes the summation amplifier 35 comprising the operational amplifier 36 and resistors 37, 38 and 39. Shown in this figure are also possible relative positions of the edges, in the case of misalignment thereof.

The taps of the detectors 3 and 32 are connected through the secondary emission current-to-voltage converters to the inputs of the differential amplifier 27 and to the inputs of the summation amplifier 35. The operational amplifier's 36 operating mode is set by resistors 37 and 38 connected to its inversion input and a feedback resistor 39. The outputs 40 and 41 of the differential and of the summation amplifiers 27 and 35 respectively are the outputs of the device.

Such construction of the proposed device makes it possible to produce both a signal indicative of variation in the workpiece surface being scanned and a signal indicative of the amount of misalignment of the edges of these workpieces.

For preventing interference of electrons from other sources, while measuring the amount of misalignment of the edges, for instance, in the case of using several electron beam welding devices simultaneously, it is expedient that the seam detecting electron beam device be constructed as shown in FIG. 6. According to this embodiment the proposed device comprises four secondary emission detectors 3,32,42 and 43 accommodated in tubular shields. The detection zones of the detectors 3 and 42 coincide with the scanning electron beam impingement zone AB, and the detection zones of the detectors 32 and 43 are in adjacent relationship with the detection zones 3 and 42, and hence with the zone AB. The detectors 3 and 32 and 42 and 43 are grouped in pairs and connected to the same differential units 6 and 44 whose outputs are connected to the inputs of the summation amplifier 35 and differential amplifier 45. The differential unit 44, as well as the unit 6 (FIGS. 4, 5 and 6), includes two secondary emission current-to-voltage converters 46 and 47, and a differential amplifier 48. The outputs of the amplifiers 35 and 45 are the outputs of the device.

The proposed device operates as follows. The scanning electron beam generating means 1 (FIG. 2) forms a flow of electrons emitted by the cathode 19 under the action of heating filament 18. The magnitude of the electron beam 14 current is controlled by the control electrode 20 and anode 21, and its dimensions (diameter, focal point position) are determined by the magnetic field of the focussing system 22, with the coordinates of the focal point of the electron beam 14 on the surface of the workpiece being welded being controlled by the magnetic field of the deflection electromagnetic system 23 which is controlled by the device which is not shown in the drawings.

The heating filament 18, cathode 19, control electrode 20, anode 21, and focussing system 22 are connected to the power supply source 2 of the scanning electron beam 14 generating means 1.

When the scanning electron beam impinges on the surface of the workpiece in the zone AB, its electrons are reflected to form a flow 15 of secondary electrons which are collected by the detector 3 accommodated in the tubular shield 4. The tubular shield 4 projects the detector 3 from being influenced by electromagnetic fields and forms the detection zone thereof on the surface of the workpiece being welded (zone from which it receives the flow 15 of the secondary electrons). Irregularities of the workpiece 16 surface in the zone AB vary the flow of the secondary electrons, thereby modulating the secondary emission current passing through the detector 3, depending on variation in the surface being scanned. At the moment when the electron beam 14 crosses the seam the intensity of flow 15 of the secondary electrons sharply decreases. The surface contrast in the AB zone, reproduced by the flow 15 of the secondary electrons, depends on the reflectivity of the workpiece material, irregularities ratio (for example, of the seam), and the scanning electron beam focal point diameter on the surface of the workpiece, as well on the other various interferences, for instance, pulsations. The pulsation intensity of the secondary electron flow 15 depends on the instability of the electron beam 14 current, which, in turn, depends on the voltage fluctuations of the power supply sourse 2. The secondary electron flow 15 pulsation and, hence, the secondary emission current pulsation at the tap 5 of the detector 3, which pulsations may distort the signal indicative of variation in the workpiece surface, are neutralized by the differential unit 6.

As can be seen in FIG. 1 (and in the other figures) the differential unit 6 has two inputs, namely, as input 7 and an input 8. To the input 8 is fed from the tap 5 of the detector 3 the secondary emission current, and to the input 7 is fed the current from the power supply source 2. In the differential unit 6 the current from the power supply source 2 is subtracted from the current of the detector 3 so that equal pulsations of these currents are eliminated, thereby increasing the reliability of information on the surface variation, carried by the information signal, and improving the sensitivity of the device to the irregularities of the workpiece surface, and especially sensitivity to the size of the gap CD of the workpiece being welded, which in turn facilitates controlling the electron beam welding process.

The differential unit 6 may be constructed as a differential transformer (FIG. 2) whose primary windings 11 and 12 are in opposed relationship and connected to the output 10 of the power supply source 2 and to the tap 5 of the detector 3, and whose secondary winding terminals are the output 9 of the differential unit 6. In this case the differential transformer with windings 11, 12 and 13 differentiates the current from the detector 3 depending on the scanning beam 14 pulsations, and the signal at the output 9 of the unit 6 varies depending on variation in the workpiece 16 surface, thus being indicative of surface variation. Due to such construction the proposed device features better noise immunity than the prior art devices of this type. In addition, determining the center line of the seam gap CD in the system of directing the welding beam at the seam is also simplified. In the cases when the electron beam scanning amplitude (zone AB) considerably exceeds the gap size, the transformer secondary 13 can be shunted by a diode, thereby increasing the passing band of the differential unit 6 and the device as a whole.

The passing band of the differential unit 6 can be also increased by including therein the secondary emission current-to-voltage converter 24 and the differential amplifier 27 (FIG. 3). The converter 24 has the operational amplifier 25 with a negative feedback resistor 26 having its inversion input connected to the tap 5 of the detector 3. Due to a low input resistance $R_{26}/K$ of the operational amplifier 25, where $R_{26}$ is resistance of the resistor 26, K is an amplifier gain of the amplifier 25, with $K \geq 100,000$, the unit 6 is not affected by magnetic fields produced by the interaction of the electron beam with metal vapors during welding, which provides that measuring the secondary emission current does not depend on the capacitance of the detector 3, thereby improving operating speed of the preposed device.

The differential amplifier 27 also includes the operational amplifier 28 with a negative current feedback resistor 31. Connected to the inputs of the amplifier 28, through the resistors 29 and 30, are the output 10 of the power supply source 2 and the output of the secondary emission current-to-voltage converter 24. The output of the differential amplifier 27 is the output 9 of the unit 6.

The output information signal is found by Equation:

$$U = (I_1 \cdot R_{26} - U_2)(R_{31}/R_{29})$$

where:
$I_1$ is a secondary emission current of the detector 3,
$U_2$ is a signal from the output 10 of the power supply source 2 proportional to the current of the scanning electron beam 14,
$R_{29}$ and $R_{31}$ are resistances of the resistors 29 and 31.

In the cases of electron beam welding using several electron beam generating means, or when for tracking a seam use is made of a low-power electron beam 14 of an auxiliary electron beam generating means, a level of the secondary emission noise resulting from the electron beam impingement on the workpiece surface in the zone AB considerably exceeds the level of the secondary emission signal representing variation in the workpiece surface. To remedy this disadvantage the device is provided with a second detector 32 (FIG. 4) accommodated in a tubular shield 33 and intended for producing a signal indicative of surface variation in the scanning electron beam 14 impingement zone AB. The detection zones of the detectors 3 and 32 are equal and adjoin each other, the detection zone of the detector 3 coinciding with the scanning electron beam impingement zone AB. The detector 32 receives spurious secondary electron flow 15 consisting of only the secondary emission stray electrons, and the detector 3 receives a secondary electrons flow consisting both of the beam 14 electrons reflected from the workpiece surface and the secondary emission stray electrons. The currents of the detectors 3, and 32 are converted into voltage by the converters 24 and 34. In the differential amplifier 27 the detector 32 voltage is subtracted from the detector 3 voltage to thereby eliminate pulsation. The output of the amplifier 27 is the output 9 of the device.

In the course of electron beam welding the need may arise to have other kinds of information on the surface being scanned, for instance, on the amount and kind of misalignment of the edges, which may occur during welding affecting the resultant joint weld quality, since misalignment of the edges affects the degrees of accuracy of directing the welding electron beam at the seam. This disadvantage can be overcome with the aid of an alternative embodiment of the proposed device, wherein there is provided a summation amplifier (FIG. 5). This modification includes two detectors 3 and 32 accommodated in the tubular shields 4 and 33. The detection zones of the detectors 3 and 32 coincide with the zone AB of the scanning electron beam 14 impingement on the workpiece surface. Misalignment of the edges relative to each other (FIG. 4a—$Z_1$, 4b—$Z_2$) varies the flow 15 of the secondary electrons, and thereby modulates the secondary emission current of the detectors 3 and 32. If $Z_1$ is greater than $Z_2$, the flow 15 of the secondary electrons collected by the detector 3 will be lower in intensity than the flow 15 of the secondary electrons collected by the detector 32; and, on the other hand, if $Z_2$ is greater than $Z_1$, the flow 15 intensity of the secondary electrons collected by the detector 32 will be lower than that of the flow 15 of the electrons collected by the detector 3. This results in the currents of the detectors 3 32 having different magnitudes. On the basis of the resultant difference in their magnitudes there is determined the amount of misalignment of the edges relative to each other. The sum of the secondary emission current of the detectors 3 and 32 is indicative of variation in the workpiece surface, and in particular of the presence of the seam in the zone AB. Shown in FIG. 5 is the connection of the detectors 3 and 32 with the differential amplifier 27 and the summation amplifier 35. The summation amplifier 35 comprises the operational amplifier 36 and resistors 37, 38 and 39. Outputs 40 and 41 are the outputs of the device. At the output 40 there appears a signal representative of the amount of misalignment of the edges relative to each other, and at the output 41 there appears a signal indicative of surface variation. In the absence of such misalignment at the output 40 there appears a ZERO signal.

The above embodiment of the proposed device is applicable in different systems of automatically directing an electron beam at a seam between the workpieces being welded. The embodiments of the device shown in FIGS. 2, 3 and 5 are advisable to be used for controlling the electron beam welding carried out with the aid of one electron beam gun. In the case of using two or more electron beam generating means it is advisable to use modifications shown in FIG. 4 or a combination of devices shown in FIGS. 3, 4, 5 which may be constructed in a manner shown in FIG. 6. This combination includes four detectors 3, 32, 42 and 43 accommodated in tubular shields. The detection zones of the detectors 3 and 42 coincide with the zone AB of the electron beam impingement on the workpiece 16 surface, and the detection zones of the detectors 32 and 43 adjoin the zone AB and are equal in size to the detection zones of the detectors 3 and 42, and hence to the zone AB.

The detectors 3 and 32 and 42 and 43 are connected through the converters 24 and 34 and 46 and 47 to the inputs of the differential amplifiers respectively, to whose additional inputs is connected the output 10 of the power supply source 2 of the scanning electron beam generating means 1. The differential amplifiers 27 and 48 generate signals carrying information on surface variation in the electron beam impingement zone AB in the case of simultaneous operation of the other electron beam generating means (not shown) located in the vicinity of the electron beam generating means 1. The summation amplifier 35 adds signals applied from the outputs of the differential amplifiers 27 and 48, thus generating a signal indicative of variation in surface of the workpiece being welded; and the differential amplifier 45 supplies a signal representative of the difference of the signals from the amplifiers 27 and 48, and indicative of the amount of misalignment of the edges relative to each other.

As can be seen from the above description the proposed device has a number of advantages over the prior art apparatus for detecting a seam between abutting workpieces with the aid of an electron beam. These advantages are elimination of the influence of the electron beam pulsation, and of interference of the other electron emitting means and electromagnetic fields widened passing band of the device, improved accuracy of displaying the variation in the workpiece surface, and the possibility of measuring the amount of misalignment of the edges being welded. All these advantages of the proposed device improve the accuracy of automatically directing a welding electron beam at a seam, thereby improving the quality of the resulting seam and decreasing consumption of metal in manufacturing articles with the aid of the electron beam welding.

This invention may be variously otherwise embodied within the scope of the appended claims.

What is claimed is:

1. A device for detecting a seam between abutting workpieces by a scanning electron beam, comprising:
    a scanning electron beam generating means;
    a power supply source connected to said scanning electron beam generating means;
    at least one secondary emission detector collecting secondary electrons, having a tap, and positioned during welding between said scanning electron beam generating means and the workpiece being welded;
    at least one shield in which a respective detector is disposed;
    an information signal generator shaping signals indicative of variation in the surface of the workpiece being welded, and including a differential unit having first and second inputs and an output, said first input of said differential unit being connected to said tap of said detector, said second input of said differential unit being electrically connected to said power supply source, and said output of said differential unit being the output of the device and transmitting information signals indicative of variation in the workpiece surface and corresponding to a difference between a signal representative of pulsation of said electron beam and a signal indicative of a secondary electron flow produced in a zone of electron impingement on the workpiece surface and received by said detector.

2. A device according to claim 1, wherein said differential unit comprises a differential transformer having first and second primary windings and a secondary winding, said first primary winding being connected to said tap of said detector, said second primary winding being connected to said power supply source, and terminals of said secondary winding being the output of the device.

3. A device according to claim 1, wherein the differential unit comprises:
- a secondary emission current-to-voltage converter including an operational amplifier, an inversion input of said operational amplifier being connected to said tap of said detector, and a non-inversion input of the operational amplifier being grounded; and
- a differential amplifier including an operational amplifier,
- a first input of said differential amplifier being connected to an output of the operational amplifier of said secondary current-to-voltage converter, a second input of said differential amplifier being connected to said power supply source, and an output of said differential amplifier being the output of the device.

4. A device according to claim 1, wherein:
two secondary emission detectors collect secondary electrons and are disposed in respective tubular shields, and are positioned so that secondary emission detection zones of said detectors are equal and adjoin each other, the detection zone of one of said detectors coinciding with the zone of scanning electron beam impingement; and said differential unit comprises:
- two secondary emission current-to-voltage converters, an input of each of said converters being connected to a respective detector;
- a differential amplifier having inputs connected to outputs of respective converters, and an output of said differential amplifier being the output of the device.

5. A device according to claim 1, wherein two secondary emission detectors are disposed in tubular shields and positioned so that the secondary emission detection zones of said detectors coincide with the zone of electron beam impingement; and said differential unit comprises;
- two secondary emission current-to-voltage converters, an input of each of said secondary emission current-to-voltage converters being connected to a respective detector;
- a differential amplifier having inputs connected to outputs of respective converters;
- a summation amplifier including an operational amplifier, and having an inversion input connected to outputs of said converters, outputs of said differential and of said summation amplifiers being the output of the device, at the output of said summation amplifier there is formed an information signal indicative of variation in the workpiece surface, and at the output of said differential amplifier there is formed a signal indicative of the amount of misalignment of the edges of the workpieces being joined.

* * * * *